US010799918B2

(12) United States Patent
Lim et al.

(10) Patent No.: US 10,799,918 B2
(45) Date of Patent: Oct. 13, 2020

(54) CLEANING SYSTEM AND A METHOD OF CLEANING A SUBJECT

(71) Applicant: Hock Cheong Automec Pte. Ltd., Singapore (SG)

(72) Inventors: Han Leong Lim, Singapore (SG); Lip Lin Er, Singapore (SG)

(73) Assignee: Hock Cheong Automec Pte. Ltd., Singapore (SG)

(*) Notice: Subject to any disclaimer, the term of this patent is extended or adjusted under 35 U.S.C. 154(b) by 249 days.

(21) Appl. No.: 15/535,350

(22) PCT Filed: Dec. 9, 2015

(86) PCT No.: PCT/SG2015/050490
§ 371 (c)(1),
(2) Date: Jun. 12, 2017

(87) PCT Pub. No.: WO2016/093770
PCT Pub. Date: Jun. 16, 2016

(65) Prior Publication Data
US 2017/0354996 A1    Dec. 14, 2017

(30) Foreign Application Priority Data
Dec. 12, 2014  (SG) .......................... 10201408339W

(51) Int. Cl.
*B08B 3/00* (2006.01)
*B60S 3/04* (2006.01)
(Continued)

(52) U.S. Cl.
CPC ................ *B08B 3/003* (2013.01); *B08B 3/10* (2013.01); *B60S 3/04* (2013.01); *C11D 3/0094* (2013.01);
(Continued)

(58) Field of Classification Search
CPC ...................................................... B08B 3/003
See application file for complete search history.

(56) References Cited

U.S. PATENT DOCUMENTS

| 5,597,793 A | 1/1997 | Besse et al. |
| 6,293,290 B1 | 9/2001 | Bruce |
(Continued)

FOREIGN PATENT DOCUMENTS

| CN | 101203589 A | 6/2008 |
| CN | 101945988 A | 1/2011 |
(Continued)

OTHER PUBLICATIONS

Search Report in connection with Singapore Priority Application No. 10201408339W completed Feb. 24, 2015, four pages.
(Continued)

*Primary Examiner* — Jason Y Ko
(74) *Attorney, Agent, or Firm* — Kilpatrick Townsend & Stockton LLP

(57) ABSTRACT

A vehicle-cleaning system and method of cleaning a vehicle are provided, the system comprises a cleaning agent dispenser configured to administer a cleaning agent to a surface of a vehicle for cleaning, wherein the cleaning agent preferably comprises one or more nanoparticulate metal oxide. In one embodiment, the system comprises a chemical agent dispenser configured to separately administer a chemical agent to the surface of a vehicle to react with said cleaning agent to form a resultant foam. The system further comprises an electromagnetic wave emitting system for providing wavelength in a range of about 200 nm to about 380 nm to activate the nanoparticulate metal oxide.

18 Claims, 13 Drawing Sheets

(51) Int. Cl.
*B08B 3/10* (2006.01)
*C11D 3/00* (2006.01)
*C11D 3/12* (2006.01)
*C11D 11/00* (2006.01)

(52) U.S. Cl.
CPC .......... *C11D 3/1213* (2013.01); *C11D 11/007* (2013.01); *C11D 11/0023* (2013.01); *C11D 11/0058* (2013.01)

(56) References Cited

U.S. PATENT DOCUMENTS

| | | | |
|---|---|---|---|
| 2007/0020201 A1 | 1/2007 | Boyd et al. | |
| 2008/0132438 A1* | 6/2008 | Hoffman | A01N 25/34 510/380 |
| 2009/0170744 A1 | 7/2009 | Meine et al. | |
| 2009/0209447 A1 | 8/2009 | Philip et al. | |
| 2010/0071717 A1* | 3/2010 | Lenhart | B08B 7/0035 134/1 |
| 2011/0155192 A1* | 6/2011 | Ahmad | B60S 1/481 134/56 R |
| 2016/0022566 A1* | 1/2016 | Figura | C11D 3/3746 510/122 |

FOREIGN PATENT DOCUMENTS

| | | |
|---|---|---|
| CN | 103666876 A | 3/2014 |
| JP | 06-144435 A | 5/1994 |
| JP | 2002-104141 A | 4/2002 |
| WO | 2006/136772 A1 | 12/2006 |
| WO | WO2006/135453 A1 | 12/2006 |
| WO | WO 2007/070715 A2 | 6/2007 |

OTHER PUBLICATIONS

Chinese Patent Application No. 201580074937.6 received an Office Action dated Mar. 19, 2019, 12 pages.
International Search Report corresponding to PCT/SG2015/050490, dated Feb. 2, 2016.
International Preliminary Report on Patentability corresponding to PCT/SG2015/050490, dated Mar. 8, 2017.
CN Application No. 201580074937.6 received a Second Office Action dated Dec. 3, 2019, all pages.
TW Application No. 104141821, received an office action dated Jan. 13, 2020, all pages.

* cited by examiner

CLEANING SYSTEM AND A METHOD OF CLEANING A SUBJECT

TECHNICAL FIELD

The present disclosure relates broadly to a cleaning system and to a method of cleaning a subject.

BACKGROUND

Cleaning systems have typically been used to clean or wash subjects such as vehicles and vessels. For a vehicle such as a car, car washing systems are used to clean the exterior, and in some cases, the interior of cars. Such cleaning systems are typically classified into manual and automated cleaning systems.

In a manual cleaning system, manual labour and effort is needed for cleaning a vehicle. This may be disadvantageous as it requires attendants and may be time consuming.

On the other hand, automated cleaning systems may be classified into contact cleaning systems or non-contact cleaning systems.

In an automated contact cleaning system, water and a cleaning agent such as shampoo/detergent are typically dispensed onto a vehicle. Thereafter, cleaning is achieved via rotating arms of brushes that make physical contact with the vehicle's surface. These brushes may be made from various materials including fabric, styrofoam etc. One problem with a contact cleaning system is the likelihood of damage to the vehicle. For example, for a car, wing mirrors and antennas may be damaged or misaligned by the force of the rotary brushes against the car. Another problem is that a vehicle's surface paint finish may be damaged with scratches from contact with the brushes. Consequently, such contact cleaning systems are typically not desirable.

For an automated non-contact cleaning system, such a system differs from a contact cleaning system hi that brushes are avoided. Cleaning is achieved by applying a cleaning agent of relatively higher concentration followed by using high pressured water spray to remove dirt. A non-contact system aims to reduce damage to a vehicle's surface. However, the cleaning efficacy is highly dependent on the type and strength of the cleaning agent used, and the strength of the water spray.

One problem with using high concentrations of cleaning agents is that chemicals such as phosphates may enter the drainage and subsequently into rivers and other water sources, thereby leading to water pollution and environmental concerns. Furthermore, using higher concentrations of cleaning agents may corrode a vehicle's surface more quickly.

As for using high pressured water sprays, one problem with using a high pressured water spray is the level of noise pollution produced, hence rendering it unsuitable for use in residential and dense built up areas. In addition, the use of a high pressured water spray may also cause damage to a vehicle surface over time. For example, if a vehicle is subjected to prolonged spraying, the force from the high pressured wafer spray may force debris across the vehicle surface, causing scratch marks to appear.

Therefore, the non-contact cleaning system also poses disadvantages for use e.g. in an urbanised city.

Thus, there is a need for a cleaning system and a method of cleaning a subject that seek to address at least one of the above problems.

SUMMARY

In accordance with an aspect, there is provided a cleaning system comprising, a cleaning agent dispenser configured to administer a cleaning agent to a surface of a subject for cleaning, wherein the cleaning agent comprises one or more nanoparticulate material.

The subject for cleaning may be a car.

The cleaning system may further comprise an electromagnetic wave emitting source configured to provide a specific wavelength of an electromagnetic wave to the surface of the subject for cleaning.

The cleaning agent may further comprise a pre-mixed chemical agent to facilitate foaming of the cleaning agent.

The cleaning system may further comprise a chemical agent dispenser configured to administer a chemical agent to the surface of the subject for cleaning.

The cleaning system may further comprise the electromagnetic wave emitting source being configured to emit a wavelength in a range of about 200 nm to about 380 nm to activate the one or more nanoparticulate material.

The cleaning system may further comprise the chemical agent dispenser being configured to administer the chemical agent to react with the cleaning agent to form resultant foam.

The cleaning system may further comprise the chemical agent dispenser being configured to administer the chemical agent as a coating layer on the surface of the subject for cleaning.

The cleaning system may further comprise the chemical agent dispenser being configured to administer the chemical agent in one or more bands on the surface of the subject for cleaning.

The one or more bands may be applied along one or more axes selected from a group consisting of a horizontal axis, a vertical axis and a diagonal axis with respect to the subject for cleaning.

The nanoparticulate material may comprise metal-oxide nanoparticles.

The cleaning agent may comprise 0.3% by volume of $TiO_2$ and 0.3% by volume of ZnO.

The metal-oxide nanoparticles may comprise a mixture of titanium dioxide ($TiO_2$), zinc oxide (ZnO) and aluminium oxide ($Al_2O_3$).

The cleaning system may further comprise a processing module configured to control the cleaning system.

The cleaning system may further comprise a wind generator configured to produce air movement over the subject for cleaning.

The cleaning system may further comprise a water dispenser configured to administer fluid for rinsing the subject for cleaning.

The cleaning system may further comprise the water dispenser being further configured to administer fluid with a temperature of about 40° C. to about 70° C.

The cleaning system may further comprise the water dispenser being further configured to administer fluid with a pressure in a range of about 20 psi (138 kPa) to about 100 psi (689 kPa).

In accordance with another aspect, there is provided a method of cleaning a subject, the method comprising, administering a cleaning agent to a surface of the subject, the cleaning agent comprising one or more nanoparticulate material The subject may be a car.

The method may further comprise providing a specific wavelength of an electromagnetic wave to the surface of the subject.

The cleaning agent may further comprise a pre-mixed chemical agent to facilitate foaming of the cleaning agent.

The method may further comprise administering a chemical agent to the surface of the subject.

The step of providing a specific wavelength of an electromagnetic wave may comprise providing an electromagnetic wave with a wavelength in a range of about 200 nm to about 380 nm.

The step of administering a chemical agent may comprise forming resultant foam by administering the chemical agent to react with the cleaning agent.

The method may further comprise applying the chemical agent as a coating layer on the surface of the subject.

The method may further comprise applying the chemical agent in one or more bands on the surface of the subject.

The step of applying the chemical agent in the one or more, bands may comprise applying the chemical agent along one or more axes selected from a group consisting of a horizontal axis, a vertical axis and a diagonal axis with respect to the subject.

The nanoparticulate material may comprise metal-oxide nanoparticles.

The cleaning agent may comprise 0.3% by volume of $TiO_2$ and 0.3% by volume of ZnO.

The metal-oxide nanoparticles may comprise a mixture of titanium dioxide ($TiO_2$), zinc oxide (ZnO) and aluminium oxide ($Al_2O_3$).

The method may further comprise producing air movement over the subject.

The method may further comprise administering fluid to rinse the subject.

The method may further comprise administering the fluid with a temperature of about 40° C. to about 70° C.

The method may further comprise administering the fluid with a pressure in a range of about 20 psi (138 kPa) to about 100 psi (689 kPa).

In accordance with another aspect, there is provided a non-transitory computer readable storage medium having stored thereon instructions for instructing a processing module of a cleaning system to execute a method of cleaning a subject, the method comprising, administering a cleaning agent to a surface of the subject, the cleaning agent comprising one or more nanoparticulate material.

The subject may be a car.

The method may further comprise providing a specific wavelength of an electromagnetic wave to the surface of the subject.

The method may further comprise administering a chemical agent to the surface of the subject.

BRIEF DESCRIPTION OF THE DRAWINGS

Example embodiments of the invention will be better understood and readily apparent to one of ordinary skill in the art from the following written description, by way of example only, and in conjunction with the drawings, in which.

DETAILED DESCRIPTION

Exemplary, non-limiting embodiments may provide a cleaning system and a method of cleaning a subject.

In example embodiments described below, the subject for cleaning may be a vehicle.

Figure 1:
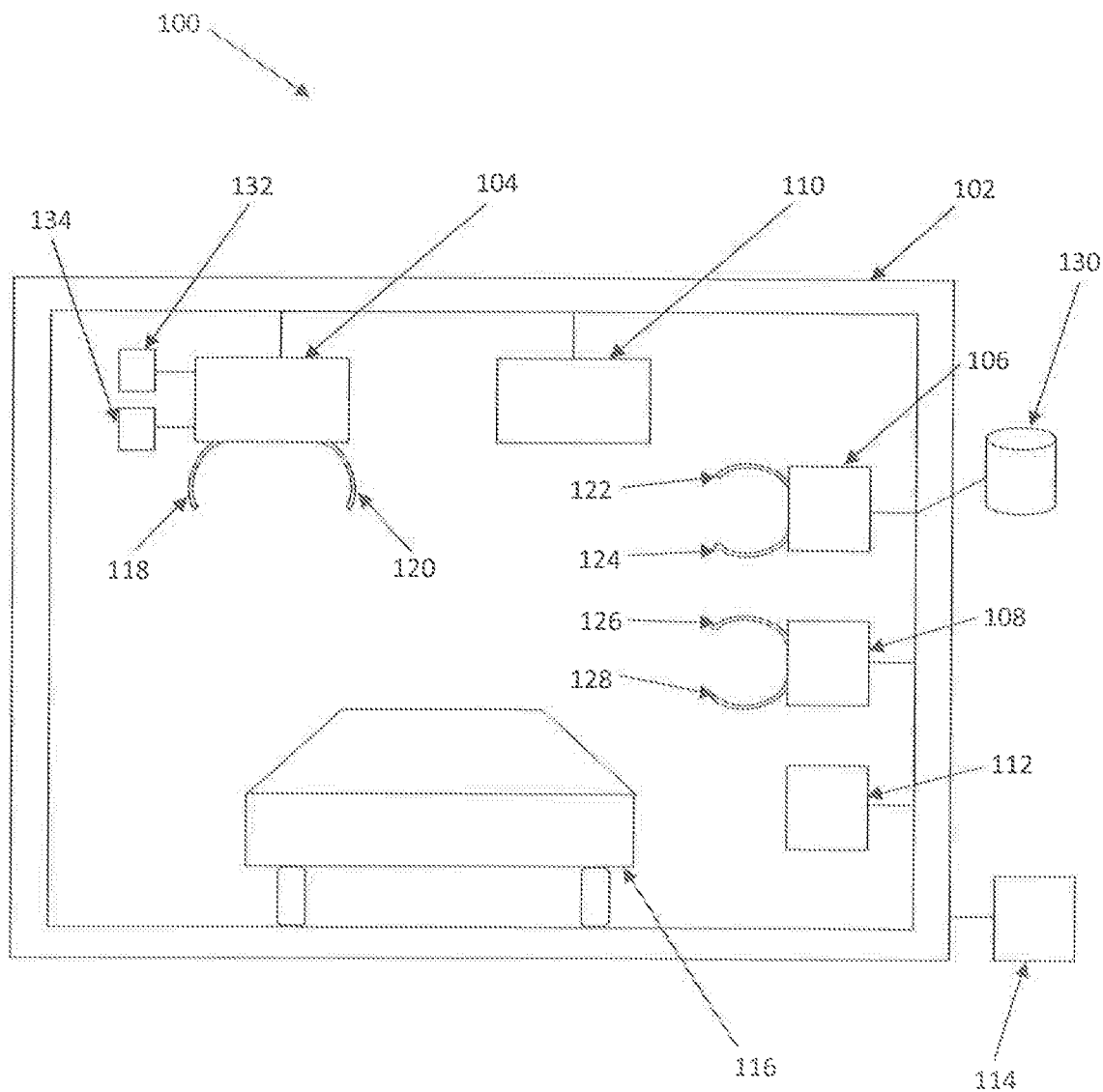
FIG. 1 is a schematic drawing of a cleaning system in an example embodiment.

FIG. 1 is a schematic drawing of a cleaning system 100 in an example embodiment. The cleaning system 100 comprises a docking bay 102 for housing at least one vehicle such as a car 118 in the example embodiment. The docking bay 102 is coupled to a fluid or water dispenser 104, a cleaning agent dispenser 106 and an electromagnetic wave emitting source 110. The docking bay 102 is preferably also coupled to a wind generator 112 and a processing module 114, the processing module 114 for controlling and monitoring the process of cleaning in the cleaning system 100. In the example embodiment, the docking bay 102 is additionally coupled to a chemical agent dispenser 108. In alternative example embodiments, the cleaning agent dispenser 106 may be modified to provide or dispense a pre-mixed solution of a cleaning agent and a chemical agent.

The docking bay 102 functions to house at least one vehicle during cleaning by the cleaning system 100. The docking bay 102 may be sheltered, e.g. by a vehicle shelter or a stationary structure/housing. The vehicle e.g. the car 116 may be positioned into the docking bay 102 by a delivery mechanism e.g. a rail/roller/trolley system (not shown) or may be driven into the docking bay 102 by a user of the car 116. The docking bay 102 may further comprise sensors (not shown) for sensing the position of the car 116 and a set of markings (not shown) for guiding the user maneuvering the car 116 into the docking bay 102.

The water dispenser 104 functions to provide fluid or water for washing and rinsing the car 116. The water dispenser 104 comprises one or more nozzles e.g. 118, 120 configured to project/dispense water at the surface of the car 116. The nozzles e.g. 118, 120 may be positioned at different angles within the docking bay 102 to dispense water to substantially all exterior surfaces e.g. front, rear, side, and top sides of the car 116. The water dispenser 104 may further comprise an actuating rotating mechanism which moves the nozzles e.g. 118, 120 about the docking bay 102 to dispense water to substantially all exterior surfaces of the car 116. For example, the nozzles e.g. 118, 120 may be mounted on e.g. a rail/trolley carnage system. The nozzles e.g. 118, 120 may be configured to be pivotable about one or more axis/plane. The actuating rotating mechanism may be configured to move the nozzles e.g. 118, 120 across a length, or a breadth or both, of the car 116. The actuating rotating mechanism may also be configured for the nozzles e.g. 118, 120 to circumnavigate the car 116.

In the example embodiment, the water dispenser 104 is controllable by the processing module 114 and is preferably further configured to vary the temperature, pressure and source of water being projected. For example, the water dispenser 104 may be configured to project recycled water from a first tank source (not shown) for initial washing and clean water from a second tank source (not shown) for final rinsing. The water pressure from the water dispenser 104 may also be varied to adjust the force of water contacting the surface of the car 116.

In the example embodiment, the wafer dispenser 104 may further comprise a heating element 132 and a pump 134. The heating element 132 is capable of heating water to a temperature from about 30° C. to about 70° C. prior to discharge from the nozzles e.g. 118, 120. The pump 134 functions to pressurize the water prior to discharge from the nozzles e.g. 118, 120. The water pressure may be increased in a range of about 500 psi (3.45 MPa) to about 600 psi (4.14 MPa) to deliver a high pressure spray/jet of wafer at the surface of the car 116. The pump 134 may also be configured to deliver a low pressure spray/jet of wafer from a range of about 20 psi (138 kPa) to about 100 psi (889 kPa)

The cleaning agent dispenser 106 functions to provide and apply a cleaning agent onto the car 116. The cleaning agent dispenser 106 comprises one or more nozzles e.g. 122, 124 configured to project/dispense a cleaning agent onto the car 116. The nozzles e.g. 122, 124 are positioned at different angles within the docking bay 102 to dispense cleaning agent at substantially all exterior surfaces e.g. front, rear, side, and top sides of the car 116. In the example embodiment, the cleaning agent dispenser 106 is coupled to a cleaning agent source 130. The cleaning agent source 130 provides an additive mixture to the cleaning agent which comprises nanoparticulate material, in particular, nanoparticles or nanoparticle colloid. For example, the nanoparticles may include metallic or metal-oxide nanoparticles such as, but not limited to, titanium dioxide ($TiO_2$), zinc oxide (ZnO) and/or aluminium oxide ($Al_2O_3$), each comprising about 0.01% to about 10% by volume of the total volume of the cleaning agent composition. For example, the cleaning agent may comprise 0.3% $TiO_2$ and 0.3% ZnO by volume added to a cleaning solution, e.g. a vehicle cleaning solution comprising 12% dialkyl sulphosuccinate, 8% alkylbenzene sulphonate, 8% alkyl ester sulphate and 10% urea by weight of the total composition.

In another example, the composition of the cleaning agent may comprise some or all the following chemicals: titanium dioxide ($TiO_2$) nanoparticles each having a diameter of about 10 nm to about 1000 nm and comprising about 0.01% to about 10% by volume of the total volume of the composition; zinc oxide (ZnO) nanoparticles each having a diameter of about 10 nm to about 1000 nm and comprising about 0.01% to about 10% by volume of the total volume of the composition; aluminium oxide ($Al_2O_3$) nanoparticles each having a diameter of about 10 nm to about 1000 nm and comprising about 0.01% to about 10% by volume of the total volume of the composition; a dispersant polymer of sodium salt of a polyacrylic acid for mineral slurries comprising about 1% to about 30% by weight of the total composition; a homopolymer of acrylic acid detergent polymer comprising about 1% to about 30% weight of the total composition; large volume anionic synthetic surfactant; and soda ash comprising about 1% to about 30% by weight of the total composition.

The cleaning agent dispenser 106 may further comprise an actuating rotating mechanism which moves the nozzles e.g. 122, 124 about the docking bay 102 to dispense a cleaning agent to substantially all exterior surfaces of the car 116. For example, the nozzles e.g. 122, 124 may be mounted on e.g. a rail/trolley carriage system. The nozzles e.g. 122, 124 may be configured to be pivotable about one or more axis/plane. The actuating rotating mechanism may be configured to move the nozzles e.g. 122, 124 across a length or a breadth, or both, of the car 116. The actuating rotating mechanism may also be configured for the nozzles e.g. 122, 124 to circumnavigate the car 116.

The chemical agent dispenser 108 functions to provide a chemical agent. For example, the chemical agent may comprise about 1% to about 40% by volume of an alkali-soluble acrylic polymer in an emulsion. The chemical agent dispenser 108 comprises one or more nozzles e.g. 126, 128 configured to dispense chemical agent onto the car 116 to contact the cleaning agent. The nozzles e.g. 126, 128 are positioned at different angles within the docking bay 102 to dispense chemical agent at substantially all exterior surfaces e.g. front, rear, side, and top sides of the car 116. The nozzles e g. 126, 128 may be further configured to deposit the chemical agent onto the surface of the car 116 in a variable pattern/fashion. The chemical agent functions to react with the cleaning agent and to modify one or more properties of the cleaning agent. For example, the cleaning agent by itself may provide formation of foam upon application but with a combination/reaction with the chemical agent, the chemical agent may increase the density of the cleaning agent and result in the formation of additional foam and/or gel for the cleaning agent.

The chemical agent dispenser 108 may further comprise an actuating rotating mechanism which moves the nozzles e g. 126, 128 about the docking bay 102 to dispense a chemical agent to substantially all exterior surfaces of the car 116. For example, the nozzles e.g. 126, 128 may be mounted on e.g. a rail/trolley carriage system. The nozzles e.g. 126, 128 may be configured to be pivotable about one or more axis/plane. The actuating rotating mechanism may be configured to move the nozzles e.g. 126, 128 across a length and/or a breadth of the car 116. The actuating rotating mechanism may also be configured for the nozzles e.g. 126, 128 to circumnavigate the car 116.

The electromagnetic wave emitting source 110 functions to irradiate the car 116 with a particular wavelength of electromagnetic wave, for example in a wavelength range from about 200 nm to about 380 nm. The wind generator 112 functions to generate airflow/wind for aerating the car 116. The airflow generated from the wind generator 112 facilitates the removal of material such as dirt, foam etc. from the surface of the car 116, and also the drying of the car 116. In the example embodiment, the wind generator 112 may be in the form of one or more industrial fans. In the example embodiment, the electromagnetic wave emitting source 110 is electrically powered. The electromagnetic wave emitting source 110 may be in the form of a wavelength-controllable light emitting diode (LED), or a wavelength-specific LED, or a wavelength-specific bulb. For example, an ultraviolet (UV) lamp, with a wavelength range from about 200 nm to about 380 nm, may be used.

The processing module 114 functions to instruct the parameters and workflow for components of the cleaning system 100 such as the water dispenser 104, the cleaning agent dispenser 106, the chemical agent dispenser 108, the electromagnetic wave emitting source 110 and the wind generator 112. For example, to begin cleaning of the car 116, the processing module 114 instructs the water dispenser 104 to administer water to first rinse the car 116 with water. In the example embodiment, subsequent steps such as dispensing of cleaning agent and chemical agent and further rinsing by the water dispenser 104 are controlled by the processing module 114 according to a pre-determined workflow.

Figure 2:
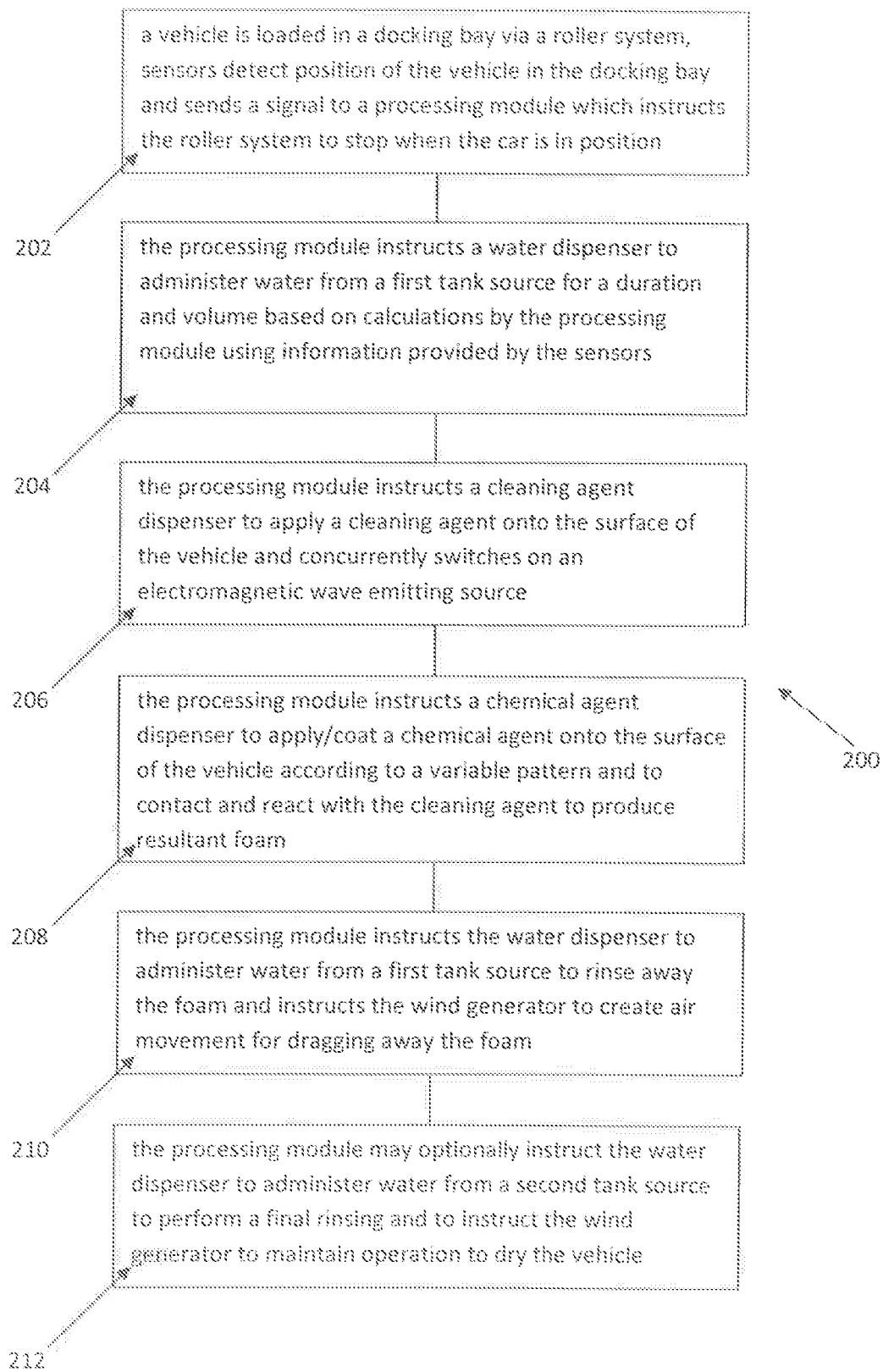
FIG. 2 is a schematic flowchart for illustrating a cleaning system in use to clean a vehicle in an example embodiment.

FIG. 2 is a schematic flowchart 200 for illustrating a cleaning system in use to clean a vehicle in an example embodiment. At step 202, a vehicle is loaded into a predetermined position within a docking bay using a roller system. Sensors e.g. position or sonar sensors in the docking bay may be used to sense the position of the vehicle in the docking bay and provide feedback to a processing module. The processing module deactivates the roller system upon receiving input from the sensors that the vehicle has been positioned in the predetermined position in the docking bay. Alternatively, a set of visual markings may be provided in the docking bay to facilitate a user of the vehicle to position the vehicle within the docking bay. Thereafter, a signal may be transmitted e.g. by a push button to the processing module to proceed with the cleaning process.

At step 204, the processing module receives feedback that the vehicle is in position and instructs a water dispenser to administer water such as recycled water from a first tank source at a temperature of about 30° C. to about 70° C. to a surface of the vehicle as a first rinse. One or more nozzles of the water dispenser mounted on an actuating rotating mechanism travel along a length and/or a breadth of the vehicle to administer the recycled water.

In an example, position sensors may be configured to detect front, rear, side, and top sides of the vehicle to allow the processing module to calculate distance of travel for the one or more nozzles. This may minimise unnecessary travelling of the one or more nozzles and wastage of water. The processing module may also use the readings from the position sensors to calculate the duration and volume of water to administer and is arranged to instruct the water dispenser to stop dispensing water once conditions e.g. volume and/or duration of water dispensed are achieved.

At step 206, the processing module instructs a cleaning agent dispenser to apply a cleaning agent from a cleaning agent source onto the surface of the vehicle. The cleaning agent may be drawn from a cleaning agent source which provides an additive mixture comprising nanoparticle colloid. One or more nozzles of the cleaning agent dispenser mounted on an actuating rotating mechanism travel along a length and/or a breadth of the vehicle to apply the cleaning agent. In alternative example embodiments, the cleaning agent source may be pre-mixed with a chemical agent.

In an example, positional information such as that measured in step 204 allows the processing module to calculate distance of travel for the one or more nozzles to coat a layer of the cleaning agent on the vehicle. This may minimise unnecessary travelling of the one or more nozzles and wastage of the cleaning agent. The processing module may instruct the cleaning agent dispenser to repeat the coating process in order to cause substantially all exterior surfaces of the vehicle to be coated with at least one layer of the cleaning agent.

The volume of cleaning agent to be dispensed may be based on vehicle size, e.g. as obtained from the readings of sensors or based on a signal transmitted, e.g. by a push button to the processing module, and the desired thickness of the cleaning agent to be applied on the vehicle surface. The cleaning agent dispenser is instructed to stop applying the cleaning agent once the desired volume and thickness of cleaning agent have been obtained.

The processing module also instructs, preferably concurrently with the dispensing of the cleaning agent, an electromagnetic wave emitting source to be switched on to irradiate/illuminate the surface of the vehicle with a predetermined wavelength of electromagnetic wave, for example, with an electromagnetic wave of about 365 nm.

At step 208, the processing module instructs a chemical agent dispenser to apply/coat a chemical agent onto the surface of the vehicle to contact the cleaning agent. In alternative example embodiments, having a chemical agent pre-mixed with the cleaning agent, this step of using a chemical agent dispenser may be optionally excluded and/or optionally modified such that the cleaning agent dispenser performs the application steps (e.g. applying in a variable pattern or as a coating layer) as described below. The application may be applied as a coating layer or may be according to a variable pattern programmed in the processing module. For example, the pattern may be an undulating/wave-like pattern, e.g. having at least a peak in the chemical agent application and a trough on/near the surface of the vehicle. In an example, the chemical agent may be applied such that one or more raised bands are created by the coated chemical agent. The one or more raised bands of chemical agent may be applied in any configuration such as, but not limited to, a vertical, horizontal and/or diagonal manner with respect to an axis of the vehicle e.g. a horizontal axis extending from a front side to a rear side of the vehicle. For a plurality of raised bands, the at least two raised bands may be spaced apart and the space between two adjacent bands of coated chemical agents may be substantially devoid of the chemical agent.

In the example embodiment, one or more nozzles of the chemical agent dispenser mounted on an actuating rotating mechanism travel along a length or a breadth, or both, of the vehicle to apply the chemical agent and create (i) an undulating pattern of the chemical agent, or (ii) a coating layer of the chemical agent substantially devoid of an undulating pattern.

In one example, to create an undulating pattern of the chemical agent, the one or more nozzles of the chemical agent dispenser may begin from the rear side of the vehicle and apply a first band of the chemical agent onto the surface of the vehicle. The actuating rotating mechanism displaces the one or more nozzles of the chemical agent dispenser by a predetermined distance and the one or more nozzles apply a second band of the chemical agent on the surface of the vehicle. This creates a space between the first and the second band of the chemical agent which may be substantially devoid of the chemical agent. This process is repeated to apply subsequent bands of chemical agents according to the variable pattern.

In another example of an undulating pattern, the one or more nozzles of the chemical agent dispenser may apply a single band of the chemical agent on the surface of the vehicle by moving along a length or a breadth of a vehicle or along a diagonal axis of the vehicle. This may be either with one nozzle applying a single band or two nozzles applying two bands immediately adjacent each other to form a single coalesced band. The single band of the chemical agent on the surface of the vehicle forms a raised feature. The raised feature results in a peak formed by the application of the chemical agent and a trough formed on/near the surface of the vehicle.

In another example, to create a coating layer e.g. a substantially even/uniform layer of the chemical agent substantially devoid of an undulating pattern, the one or more nozzles of the chemical agent dispenser may begin from the rear side of the vehicle and apply the chemical agent onto the surface of the vehicle in a substantially continuous manner or output, as the actuating rotating mechanism displaces the one or more nozzles of the chemical agent along the length and/or breadth of the vehicle. As an example, the one or more nozzles of the chemical agent dispenser may begin from the rear side of the vehicle to apply a first band of the chemical agent onto the surface of the vehicle. The actuating rotating mechanism displaces the one or more nozzles of the chemical agent dispenser by a predetermined distance such that the one or more nozzles apply a second band of the chemical agent immediately adjacent the first band of the chemical agent on the surface of the vehicle. This process is repeated to apply subsequent bands of chemical agents, resulting in the surface of the vehicle being coated with a layer of the chemical agent which is substantially even/uniform and substantially devoid of an undulating pattern.

In an example, positional information such as that measured in step 204 allows the processing module to calculate the vehicle size and distance of travel for the one or more nozzles to coat the chemical agent according to the variable pattern stored in the processing module on the vehicle. This minimises unnecessary travelling of the one or more nozzles and wastage of the chemical agent The chemical agent dispenser may be configured to begin applying the chemical agent from the rear side of the vehicle and stop applying the chemical agent once the one or more nozzles have reached the front side of the vehicle. The chemical agent combines with the cleaning agent when in contact to create additional foam and/or gel on the surface of the vehicle. The chemical agent may enhance the foaming property of the cleaning agent, increase a viscosity of the cleaning agent, and/or stabilize foam produced by the cleaning agent. The resultant foam is capable of binding to and dislodging foreign material e.g. oil, grease and dirt from the surface of the vehicle.

At step 210, the processing module instructs the water dispenser to administer water from the first tank source at a temperature of about 30° C. to about 70° C. to rinse away the resultant foam from the surface of the vehicle. The processing module may also be configured to switch on a wind generator to create air movement to assist in dragging the resultant foam away from the surface of the vehicle.

At step 212, the processing module may optionally instruct the water dispenser to administer clean water from a second tank source for final rinsing of the vehicle. The wind generator may also be maintained in operation to assist in drying the vehicle.

Figure 3:
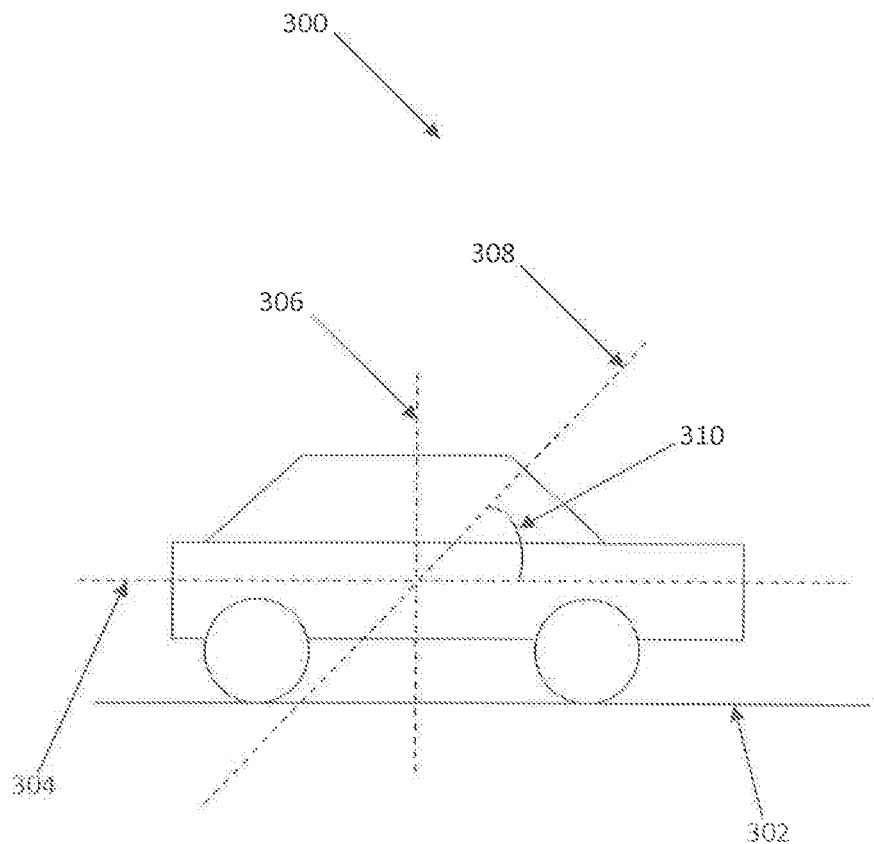
FIG. 3 is a schematic side view diagram of a car in an example embodiment.

FIG. 3 is a schematic side view diagram of a car 300 in an example embodiment. The car 300 is provided on a substantially flat surface 302. A horizontal axis 304 (e.g. x-axis) extends from a front side to a rear side of the car 300 and is substantially parallel to the flat surface 302. A vertical axis 306 (e.g. y-axis) extends from a top side to a bottom side of the car 300 and is substantially perpendicular to the flat surface 302. A diagonal axis 308 is an axis which forms an arbitrary angle 310 (such as 45°) with the horizontal axis 304 and is substantially coplanar with the plane formed by the horizontal axis 304 and the vertical axis 306.

In the example embodiment, a cleaning agent, a chemical agent and/or wafer may be dispensed in any configuration such as in an undulating pattern parallel to the horizontal axis 304, parallel to the vertical axis 306, parallel to the diagonal axis 308, or a combination of the above directions etc.

Figure 4A:
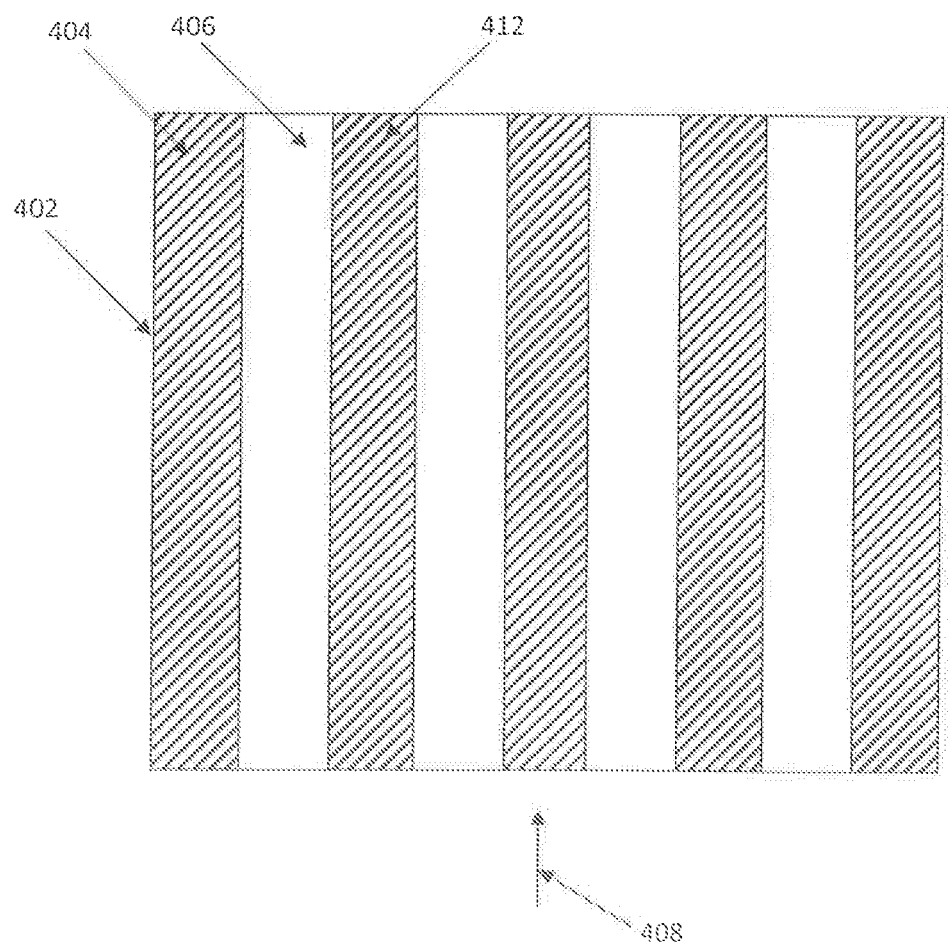
FIG. 4A is a schematic top view diagram of a series of at least two bands of a chemical agent applied on a surface in an example embodiment.
Figure 4B:
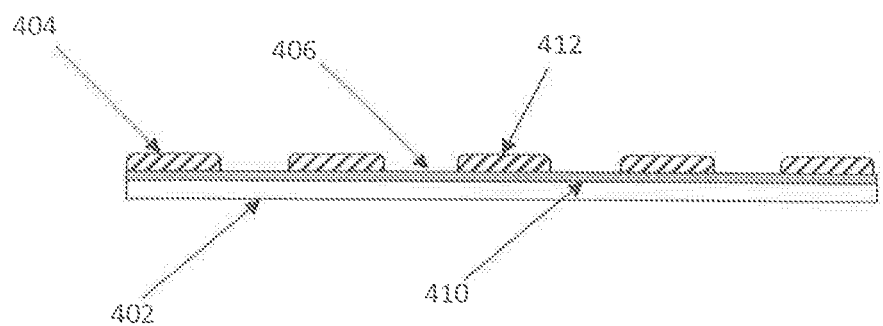
FIG. 4B is a schematic side view diagram of the series of at least two bands of a chemical agent applied on a surface of FIG. 4A.

FIG. 4A is a schematic top view diagram of a series of at least two bands e.g. 404, 412 of a chemical agent applied on a surface 402 in an example embodiment. FIG. 4B is a schematic side view diagram of the series of at least two bands e.g. 404, 412 of a chemical agent applied on a surface 402 when viewed from the direction 408.

Figure 4C:
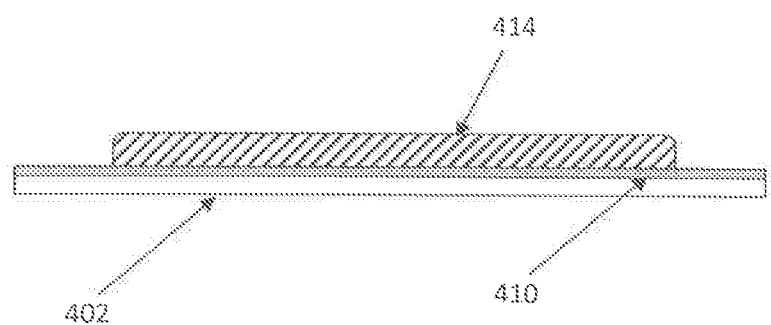
FIG. 4C is a schematic side view diagram of a single band of a chemical agent applied on a surface in an example embodiment.
Figure 4D:
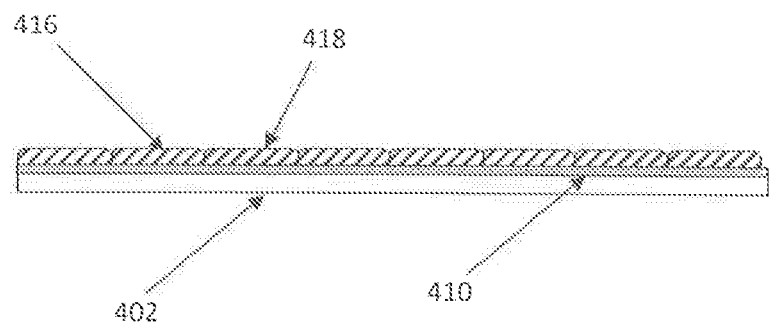
FIG. 4D is a schematic side view diagram of a series of at least two bands of a chemical agent applied on a surface to create a substantially uniform coating layer of the chemical agent in an example embodiment.

FIG. 4C is a schematic side view diagram of a single band 414 of a chemical agent applied on a surface 402 in an example embodiment. FIG. 4D is a schematic side view diagram of a series of at least two bands e.g. 404, 412 of a chemical agent applied on a surface 402 to create a substantially uniform coating layer of the chemical agent in an example embodiment In one example embodiment, a chemical agent dispenser (compare 108 of FIG. 1) coats/applies a chemical agent according to a variable pattern e.g. undulating pattern determined by a processing module (compare 114 of FIG. 1). The pattern may be a series of at least two bands e.g. 404, 412 created by the chemical agent coated thereon. See FIGS. 4A and 4B. The band 404 of chemical agent forms a raised feature on the surface 402 (see 404 of FIG. 4B). A resultant foam/gel is formed when the chemical agent combines or reacts with a cleaning agent 410 provided on the surface 402. When the series of bands e.g. 404, 412 are applied with a spacing between adjacent bands, an undulating surface formation is created wherein resultant foam/gel is present in the bands e.g. 404, 412. The spaces e.g. 408 between any two adjacent bands e.g. 404 are substantially devoid of chemical agent and therefore, the resultant foam/gel. The chemical agent dispenser (compare 108 of FIG. 1) may be configured to deposit the series of bands e.g. 404 in a vertical, horizontal and/or diagonal manner relative to the axes as described with reference to FIG. 3. For example, the bands e.g. 404 may be applied in a horizontal manner by applying the bands e.g. 404 substantially parallel to the horizontal axis (compare 304 of FIG. 3).

In another example embodiment, with reference to FIG. 4C, an undulating pattern may also be formed with a single band 414 of chemical agent applied onto the surface 402 (see 414 of FIG. 4C). The single band 414 of chemical agent forms a raised feature on the surface 402. The raised feature results in an undulating pattern with a peak formed by the raised feature and a trough on/near the surface 402. A resultant foam/gel is formed when the chemical agent combines or reacts with a cleaning agent 410 provided on the surface 402. The chemical agent dispenser (compare 108 of FIG. 1) may be configured to deposit the single band 414 in a vertical, horizontal or diagonal manner relative to the axes as described with reference to FIG. 3. For example, the single band 414 may be applied in a horizontal manner by applying the single band 414 substantially parallel to the horizontal axis (compare 304 of FIG. 3).

In another example embodiment, with reference to FIG. 4D, a chemical agent dispenser (compare 108 of FIG. 1)

coats/applies a chemical agent as a substantially uniform/ even layer which is substantially devoid of an undulating pattern, as determined by a processing module (compare 114 of FIG. 1). The substantially uniform/even layer may be formed by applying a series of at least two bands e.g. 416, 418 created by the chemical agent coated thereon. The bands e.g. 416, 418 are applied immediately adjacent each other such that there are substantially no gaps formed between adjacent bands e.g. 416, 418. This results in a substantially uniform layer of the chemical agent formed on the surface 402 (see FIG. 4D). The chemical agent dispenser (compare 108 of FIG. 1) may be configured to deposit the series of bands e.g. 416 in a vertical, horizontal and/or diagonal manner relative to the axes as described with reference to FIG. 3. For example, the bands e.g. 416 may be applied in a horizontal manner by applying the bands e.g. 416 substantially parallel to the horizontal axis (compare 304 of FIG. 3).

One effect of depositing the chemical agent in the described manner of FIGS. 4B and 4C is that the undulating pattern of e.g. 404, 412, 414 on the surface 402 creates a localized concentration of differential pressure due to a difference in density across the whole resultant foam surface along the surface 402. Advantageously, these localized pressure zones, e.g. lower pressures at e.g. 406, provide a source of mechanical energy to dislodge foreign bodies/material when the resultant foam surface is washed down by rinse water. The combination of the cleaning agent and the undulating pattern of resultant foam may be capable of achieving better cleaning properties as compared to a uniform surface of foam. In addition, better cleaning properties may be achieved without the toxicity of concentrated shampoo/detergent used in a typical non-contact cleaning system.

In an example embodiment, a cleaning agent composition is provided and comprises a mixture of nanoparticles, an anionic surfactant, a nonionic surfactant, a detergent builder, and water.

In the example embodiment, the nanoparticles functions to enhance/improve the cleaning effect of the cleaning agent. The nanoparticles may comprise about 0.3% $TiO_2$ and about 0.3% ZnO by volume of the total volume of the cleaning agent composition. The nanoparticles used in the cleaning agent composition may be in any shape or mixture of shapes. Preferably, a spherical shape is used. The effective diameter of a nanoparticle in the example embodiment ranges from about 10 nm to about 1000 nm.

In the example embodiment, the nanoparticles comprise a water-insoluble compound which may in turn comprise metallic or inorganic metal oxides nanoparticles. The nanoparticles may be classified into photoactive and non-photoactive nanoparticles. Photoactive nanoparticles may be activated from absorption of specific wavelengths of electromagnetic waves. For example, the cleaning agent containing nanoparticles may be illuminated with an electromagnetic wave with a wavelength of about 365 nm. Examples of photoactive nanoparticles include, but are not limited to, zinc oxide and titanium oxide. Non-photoactive nanoparticles may not be dependent on ultraviolet or visible light to produce the desired effects of removing material from a vehicle surface. Examples of non-photoactive nanoparticles include, but are not limited to, aluminium oxide, silicon dioxide, zirconium oxide, magnesium oxide, and boehmite alumina nanoparticles.

In the example embodiment, the nanoparticles in the cleaning agent comprise a mixture of titanium dioxide ($TiO_2$), zinc oxide (ZnO) and aluminium oxide ($Al_2O_3$) as an example. In the example embodiment, the nanoparticles composite mixture is added as a percentage of the total volume of the cleaning agent solution. When the cleaning agent composition is introduced to a surface stained with foreign bodies/material e.g. oil, grease and dirt, the nanoparticles gather and rearrange around the foreign bodies/material, thereby creating a wedge-like region/wedge film between the surface and the foreign bodies/material. As more nanoparticles diffuse into the wedge film, a difference in osmotic pressures arises between the wedge film and the surrounding cleaning agent composition. This results in the formation of repulsive structural forces at an interface of the surface and the foreign bodies/material, causing the foreign bodies/material to detach from the surface.

In addition, under the irradiation of, for example, ultraviolet light, the nanoparticles may also be capable of undergoing a reaction to provide a photo-electro-chemical effect, resulting in the formation of electrostatic charged particles. These charged particles, upon contact with the joint surface of the oil, grease and did and the vehicle surface, may alter the surface energies of both surfaces to agitate material such as oil, grease and dirt. This may advantageously assist the detergent to detach/dislodge foreign bodies/material from the surface of the vehicle. The wavelength of ultra-violet light for producing the photo-electro-chemical effect may range from about 200 nm to about 380 nm. It should be appreciated that both photoactive and non-photoactive nanoparticles in the cleaning agent composition may be capable of providing the above cleaning effects even if they are not photoactivated.

The inventors nave recognised that with using conventional detergents with only hydrophilic/hydrophobic properties, the mere presence of detergents alone can only bind to dirt, soil and debris and is unable to remove these foreign bodies/material e.g. oil, grease and did until some fours of mechanical energy or agitation is added. With conventional detergents, only with blasting high velocity water jet at the vehicle surface or mechanical scrapping of the vehicle surface by a human cleaner and/or a brush allows the detergents to pull the foreign material/bodies away from the vehicle surface and into the rinse water. That is, the rinsing water washes the detergents and foreign bodies away only with required external forces (such as water pressure or mechanical energy).

The inventors have recognised that one advantage of using nanoparticles in combination with photoactivation such as with ultraviolet light irradiation is that the mechanical force which was previously required to peel away the foreign material/bodies from the surface of vehicles may now be replaced by electrostatic repulsive force, which is converted from light energy by the nanoparticles. This significantly reduces the dependence on mechanical energy to pull the foreign material/bodies away from the surface of vehicles.

In the example embodiment, the cleaning agent composition may further comprise surfactant compounds (e.g. anionic, non-ionic). Surfactants are compounds which reduce the surface tension of liquids, or reduce interfacial tension between two liquids, or a liquid and a solid. Surfactants typically comprise a hydrophilic and a hydrophobic chain. Surfactants function to improve wetting; bind to oil, grease and dirt; produce, modify or control foam; create emulsions or dispersions; and to modify viscosity. Anionic surfactants possess a negatively charged surface-active ion while nonionic surfactants molecules are uncharged. Cationic surfactants possess a positive charge and are generally not preferred in the art as they are considered typically to be poor detergents or foaming agents. Cationic surfactants typically cannot be mixed in formulations which contain anionic surfactants.

In the example embodiment, the anionic surfactant may comprise an amount of one anionic surfactant effective for cleaning purposes or a mixture of anionic surfactants. Anionic surfactants are useful in cleaning agent compositions due to their wetting and cleansing properties. Anionic surfactants include sulfonates and sulfates. Examples of anionic surfactants include, but are not limited to, alkyl aryl sulfonates, secondary alkane sulfonates, alkyl methyl ester sulfonates, alpha olefin sulfonates, alkyl ether sulfates, alkyl sulfates, and alcohol sulfates.

In the example embodiment, the nonionic surfactant may include, but are not limited to, alkyl polysaccharides, alkylamine ethoxylates, amine oxides, block copolymers, castor oil ethoxylates, ceto-oleyl alcohol ethoxylates, cetostearyl alcohol ethoxylates, decyl alcohol ethoxylates, dinonyl phenol ethoxylates, dodecyl phenol ethoxylates, end-capped ethoxylates, ethoxylated alkanolamides, ethylene glycol esters, fatty acid alkanolamides, fatty alcohol alkoxylates, lauryl alcohol ethoxylates, mono-branched alcohol ethoxylates, nonyl phenol ethoxylates, octyl phenol ethoxylates, random copolymer alkoxylates, sorbitan ester ethoxylates, stearic acid ethoxylates, synthetic alcohol ethoxylates, tall oil fatty acid ethoxylates, and tallow amine ethoxylates.

In the example embodiment, the cationic surfactant may include, but are not limited to, quaternary ammonium compounds.

In the example embodiment, the detergent builders are compounds that enhance the detergency action and are preferably sequestering agents which promote the solubility of the surfactants in water. Detergent builder compounds are typically alkali metal compounds, such as, alkali metal silicates, alkali metal carbonates, alkali metal phosphates, and the like. Examples of detergent builders include, but are not limited to, sodium tripolyphosphate, tetrapotassium pyrophosphate, tetrasodium pyrophosphate, trisodium phosphate, sodium hexametaphosphate, sodium metasilicate, sodium metasilicate pentahydrate, soda ash, potassium carbonate, sodium bicarbonate, sodium hydroxide, potassium hydroxide and lithium hydroxide.

In an example embodiment, a chemical agent is provided. The chemical agent may intensify the density of a cleaning agent and cause the cleaning agent to partially solidify into gel, resulting in formation of additional foam. The chemical agent may be a chemical compound or a mixture of chemical compounds. The chemical compound may be a foam boosting agent which enhances the foaming property of, and adjust/build a viscosity of, a detergent/cleaning agent composition. For example, the foam boosting agent may be fatty acid alkanolamides or amides. Alkanoamides are non-ionic surfactants and may be used as a thickening agent in a shampoo and to stabilize foam created from the shampoo. The application of the chemical agent e.g. fatty acid alkanolamides may react with the cleaning agent, thereby increasing its viscosity and causing formation of additional foam.

Figure 5:
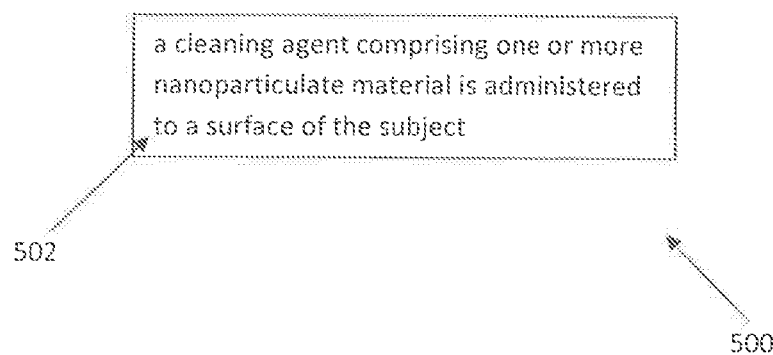
FIG. 5 is a schematic flowchart for illustrating a method of cleaning a subject in an example embodiment.

FIG. 5 is a schematic flowchart 500 for illustrating a method of cleaning a subject in an example embodiment. At step 502, a cleaning agent comprising one or more nanoparticulate material is administered to a surface of the subject.

Example embodiments of the disclosure will be better understood with the following example, which describes an experiment to examine the effectiveness of photoactivation on cleaning compositions, e.g. a car wash solution comprising nanoparticles, in removing stain.

The experimental solution comprised substantially water or $H_2O$, 4% by volume of coconut fatty acid amide of diethanolamine, 1% by volume of n-dodecylbenzene sulfonic acid, 4% by volume of potassium carbonate and 1% by volume of titanium dioxide (nanoparticles of about 20 nm in size).

For the control solution, a typical composition of current car wash shampoo used in car wash stations at petrol kiosks was used. The control solution comprised substantially water, 4% by volume of coconut fatty acid amide of diethanolamine, 1% by volume of n-dodecylbenzene sulfonic acid and 4% by volume of potassium carbonate.

That is, the difference between the experimental solution and the control solution is the addition of 1% by volume of titanium dioxide (nanoparticles of about 20 nm in size).

The experiment was carried out based on the following steps. A sample of a vehicle surface was made from cut pieces of an actual car body. The vehicle surface sample was in a sheet form having a surface. A stain paste was prepared by mixing cooking oil and tomato paste to simulate stain. About 10 ml of the stain paste was coated on the vehicle surface sample over an area of 5 cm by 5 cm. The sample was then left to dry for about 24 hours. A first image of the stain before treatment was captured using a digital camera. The vehicle surface sample was positioned upright with its surface perpendicular to a horizontal plane e.g. the ground. About 5 ml of water was sprayed onto the vehicle surface sample for wetting. The wetted sample was left standing for an interval of about 10 sec. About 10 ml of testing solution (experimental or control solution) was sprayed/dispensed onto the vehicle surface sample. The coated vehicle surface sample was then exposed to or irradiated with 0.5 W of UV lamp in a wavelength range of about 200 nm to about 380 nm for an interval of about 20 sec. About 20 ml of water was then sprayed onto the coated vehicle surface sample e.g. to remove the testing solution. The wetted vehicle surface sample was left standing for an interval of about 20 sec. The resulting vehicle surface sample was then placed on a horizontal flat surface. A second image of the stain after treatment was captured using a digital camera. Both the first and second images underwent image processing to quantify the percentage of stain covering the vehicle surface sample. The images first each underwent conversion from a colour image to a 256 level grey scale image. Next, each grey scale image underwent binarization into a 2-bits image. In the resultant images, the black pixels correspond to presence of stain, while white pixels correspond to absence (or removal) of stain. The percentage of white pixels was then calculated to quantify the amount of stain absent in each image.

Figure 6A:
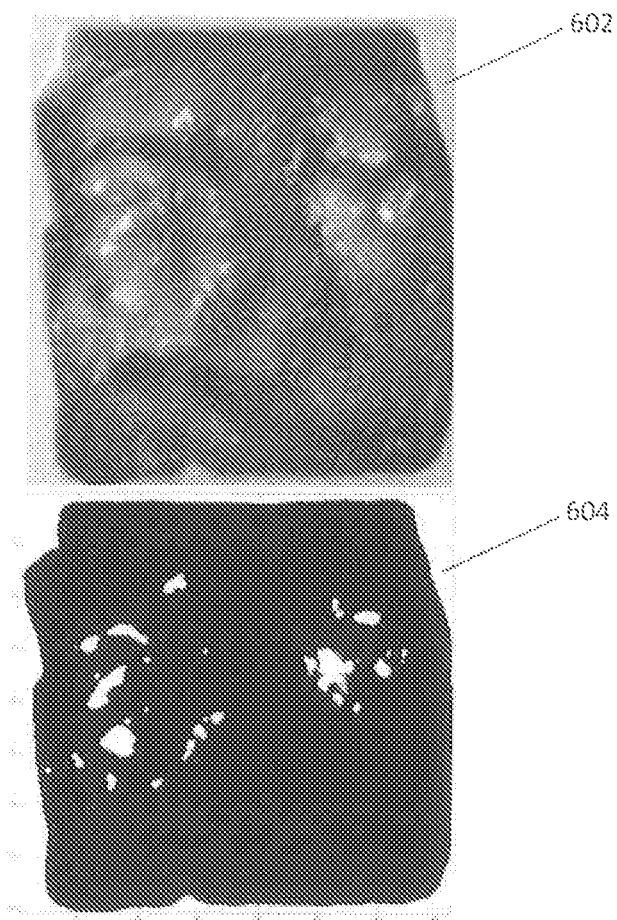
FIG. 6A shows an image of a vehicle surface sample in a control group before application of a control solution. The top-row image is a digital photograph of the vehicle surface sample while the bottom-row shows a binarization of the top-row image into a 2-bits image.
Figure 7A:
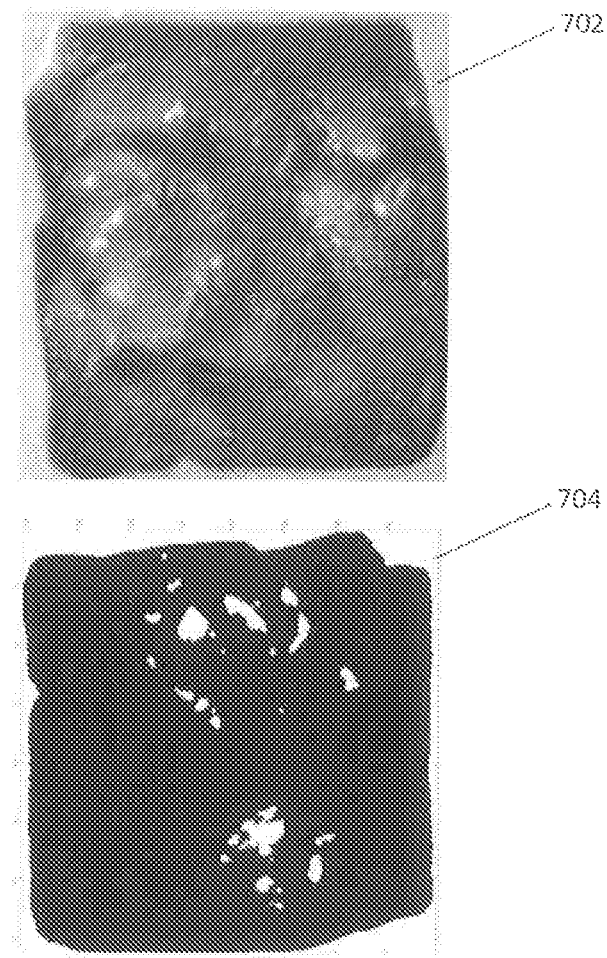
FIG. 7A shows an image of the vehicle surface sample in the control group, as depicted in FIG. 6A, after application of the control solution. The top-row image is a digital photograph of the vehicle surface sample while the bottom-row shows a binarization of the top-row image into a 2-bits image.
Figure 8:
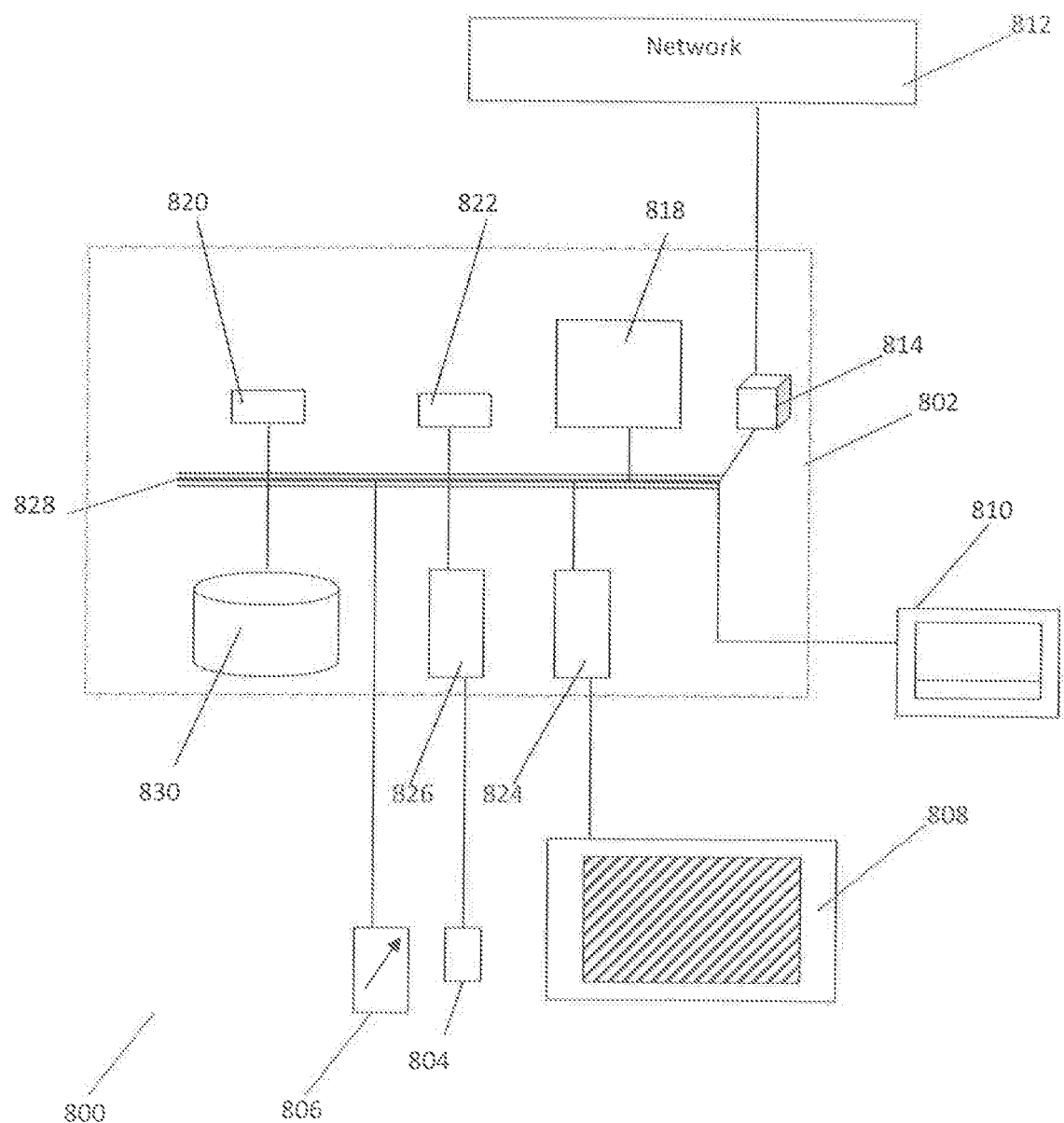
FIG. 8 is a schematic drawing of a computer system suitable for implementing an example embodiment.

The results of the experiment are shown in FIGS. 6A and 8, FIGS. 7A and B and Table 1 below.

FIG. 8A shows an image of a vehicle surface sample in a control group before application of a control solution. The top-row image 602 is a digital photograph of the vehicle surface sample while the bottom-row at numeral 604 shows a binarization of the top-row image into a 2-bits image.

Figure 6B:
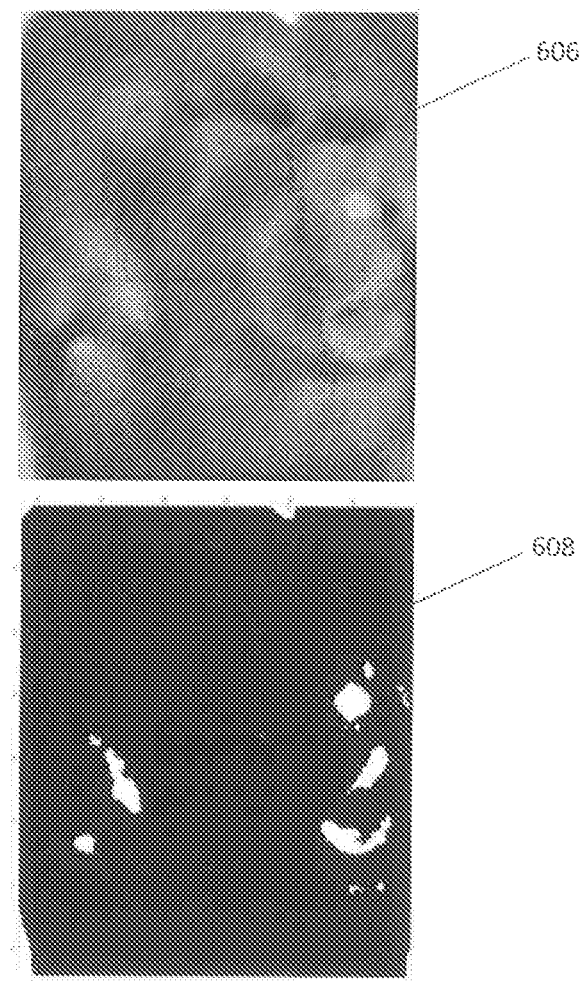
FIG. 6B shows an image of a vehicle surface sample in an experimental group before application of an experimental solution. The top-row image is a digital photograph of the vehicle surface sample while the bottom-row shows a binarization of the top-row image into a 2-bits image.

FIG. 6B shows an image of a vehicle surface sample in an experimental group before application of an experimental solution. The top-row image 606 is a digital photograph of the vehicle surface sample while the bottom-row at numeral 608 shows a binarization of the top-row image into a 2-bits image.

Table 1 Row 1 shows the percentile data of white pixels in the binarized images of FIGS. 6A and 6B.

FIG. 7A shows an image of the vehicle surface sample in the control group, as depicted in FIG. 6A, after application of the control solution. The top-row image 702 is a digital photograph of the vehicle surface sample while the bottom-row at numeral 704 shows a binarization of the top-row image into a 2-bits image.

Figure 7B:
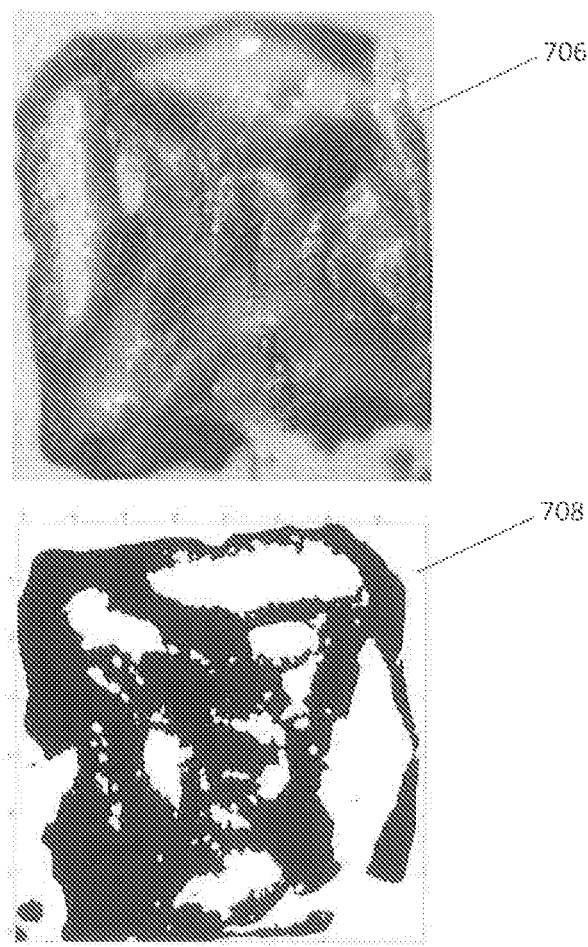
FIG. 7B shows an image of the vehicle surface sample in the experimental group, as depicted in FIG. 6B, after application of the experimental solution. The top-row image is a digital photograph of the vehicle surface sample while the bottom-row shows a binarization of the fop-row image into a 2-bits image.

FIG. 7B shows an image of the vehicle surface sample in the experimental group, as depicted in FIG. 6B, after application of the experimental solution. The top-row image 706 is a digital photograph of the vehicle surface sample while the bottom-row at numeral 708 shows a binarization of the top-row image into a 2-bits image.

Table 1 Row 2 shows the percentile data of white pixels in the binarized images of FIGS. 7A and 7B.

TABLE 1

Change in percentage of white pixels in image before and after application of solution.

| Description | Control Solution | Experimental Solution |
|---|---|---|
| Percentage of white pixels in image before application of solution | 12.56% | 2.94% |
| Percentage of white pixels in image after application of solution | 27.05% | 42.29% |

In the absence of nanoparticles, the control solution was able to reduce the stain and expose or clean the surface of the vehicle surface sample from 12.56% to 27.05%. Compare FIG. 6A with FIG. 7A and see Table 1. This translates to a stain removal of 14.49%.

Using the experimental solution, in the presence of nanoparticles with exposure or irradiation of UV light, the experimental solution was able to reduce the stain and expose or clean the surface of the vehicle surface sample from 2.94% to 42.29%. Compare FIG. 6B with FIG. 7B and see Table 1. This translates to a more efficient stain removal of 39.36%, as compared to the control solution.

The results of the experiment show that the experimental solution comprising nanoparticles is a better wash solution as compared to the control solution, and the presence of nanoparticles under ultraviolet irradiation improves the performance of the wash solution significantly.

In one example embodiment, a non-contact cleaning system and method may be provided, in other example embodiments, some contact may be allowed to assist in cleaning a subject. The non-contact cleaning system may not need cleaning apparati e.g. brushes or fabric which physically contact the surfaces of vehicles to perform cleaning. One advantage of such a non-contact cleaning system is that it substantially minimises damage to the surface of vehicles.

In described example embodiments, a cleaning agent containing nanoparticles is used.

In the described example embodiments, photoactivation energy, such as ultraviolet light, may be provided to further improve the capabilities of the nanoparticles by providing the electromagnetic wavelength to activate the photo-electro-chemical properties of nanoparticles.

The cleaning agent may combine or react with a chemical agent to form additional foam and/or gel. The resultant foam produced by the combination of cleaning agent and chemical agent may function not only to loosen/dislodge foreign bodies/materials but also additionally "engulf" and "drag" the foreign bodies/materials away from the vehicle surface. In some example embodiments, the cleaning agent is pre-mixed with the chemical agent prior to being dispensed onto the surface of the vehicle. In other example embodiments, the chemical agent is dispensed to contact the cleaning agent dispensed on the surface of the vehicle.

In addition, the application of the chemical agent to create an undulating surface formation may further assist in dragging down the foreign bodies/materials from the vehicle surface.

Another advantage of the cleaning system and method of the described example embodiment is that significantly lower pressure sprays of water may be used to achieve an effective cleaning/rinsing of the vehicle surface as compared to conventional car wash systems which typically utilize high pressure water sprays typically 500 psi (3.45 MPa) or more. This capability may be attributed to nanoparticles in the cleaning agent, which bind to and dislodge foreign bodies/material e.g. oil, grease and dirt and reduce adherence to the surface of vehicles and with the novel use of photoactivation such as using ultraviolet light. The effect may be further enhanced by further combining the cleaning agent with a chemical agent to enhance a foaming effect and even further by using an undulating surface formation of foam. Consequently, less force is required from the pressurized water spray to dislodge and remove the foreign bodies/material from the surface of vehicles. This advantageously addresses the problem of noise pollution caused by using high pressure water sprays as similar or better cleaning effects may be achieved using low pressure water sprays. Hence, described example embodiments may be suitable for use in highly built up areas where the level of noise pollution is a consideration.

Different example embodiments can be implemented in the context of data structure, program modules, program and computer instructions executed in a computer implemented environment. A general purpose computing environment is briefly disclosed herein. One or more example embodiments may be embodied in one or more computer systems, such as is schematically illustrated in FIG. 8.

One or more example embodiments may be implemented as software, such as a computer program being executed within a computer system 800, and instructing the computer system 800 to conduct a method of an example embodiment.

The computer system 800 comprises a computer unit 802, input modules such as a keyboard 804 and a pointing device 806 and a plurality of output devices such as a display 808, and printer 810. A user can interact with the computer unit 802 using the above devices. The pointing device can be implemented with a mouse, track ball, pen device or any similar device. One or more other input devices (not shown) such as a joystick, game pad, satellite dish, scanner, touch sensitive screen or the like can also be connected to the computer unit 802. The display 808 may include a cathode ray tube (CRT), liquid crystal display (LCD), field emission display (FED), plasma display or any other device that produces an image that is viewable by the user.

The computer unit 802 can be connected to a computer network 812 via a suitable transceiver device 814, to enable access to e.g. the internet or other network systems such as Local Area Network (LAN) or Wide Area Network (WAN) or a personal network. The network 812 can comprise a server, a router, a network personal computer, a peer device or other common network node, a wireless telephone or wireless personal digital assistant. Networking environments may be found in offices, enterprise-wide computer networks and home computer systems etc. The transceiver device 814 can be a modem/router unit located within or external to the computer unit 802, and may be any type of modem/router such as a cable modem or a satellite modem.

It will be appreciated that network connections shown are exemplary and other ways of establishing a communications link between computers can be used. The existence of any of various protocols, such as TCP/IP, Frame Relay, Ethernet, FTP, HTTP and the like, is presumed, and the computer unit 802 can be operated in a client-server configuration to permit a user to retrieve web pages from a web-based server. Furthermore, any of various web browsers can be used to display and manipulate data on web pages.

The computer unit 802 in the example comprises a processor 818, a Random Access Memory (RAM) 820 and a Read Only Memory (ROM) 822. The ROM 822 can be a system memory storing basic input/output system (BIOS) information. The RAM 820 can store one or more program modules such as operating systems, application programs and program data.

The computer unit 802 further comprises a number of Input/Output (I/O) interface units, for example I/O interface unit 824 to the display 808, and I/O interface unit 826 to the keyboard 804. The components of the computer unit 802 typically communicate and interface/couple connectedly via an interconnected system bus 828 and in a manner known to the person skilled in the relevant art. The bus 828 can be any of several types of bus structures including a memory bus or memory controller, a peripheral bus, and a local bus using any of a variety of bus architectures.

It will be appreciated that other devices can also be connected to the system bus 828. For example, a universal serial bus (USB) interface can be used for coupling a video or digital camera to the system bus 82. An IEEE 1394 interface may be used to couple additional devices to the computer unit 802. Other manufacturer interfaces are also possible such as FireWire developed by Apple Computer and i.Link developed by Sony. Coupling of devices to the system bus 828 can also be via a parallel pod, a game port, a PCI board or any other interface used to couple an input device to a computer. It will also be appreciated that, while the components are not shown in the figure, sound/audio can be recorded and reproduced with a microphone and a speaker. A sound card may be used to couple a microphone and a speaker to the system bus 828. It will be appreciated that several peripheral devices can be coupled to the system bus 828 via alternative interfaces simultaneously.

An application program can be supplied to the user of the computer system 800 being encoded/stored on a data storage medium such as a CD-ROM or flash memory carrier. The application program can be read using a corresponding data storage medium drive of a data storage device 830. The data storage medium is not limited to being portable and can include instances of being embedded in the computer unit 802. The data storage device 830 can comprise a hard disk interface unit and/or a removable memory interface unit (both net shown in detail) respectively coupling a hard disk drive and/or a removable memory drive to the system bus 828. This can enable reading/writing of data. Examples of removable memory drives include magnetic disk drives and optical disk drives. The drives and their associated computer-readable media, such as a floppy disk provide non-volatile storage of computer readable instructions, data structures, program modules and other data for the computer unit 802. It will be appreciated that the computer unit 802 may include several of such drives. Furthermore, the computer unit 802 may include drives for interfacing with other types of computer readable media.

The application program is read and controlled in its execution by the processor 818. Intermediate storage of program data may be accomplished using RAM 820. The method(s) of the example embodiments can be implemented as computer readable instructions, computer executable components, or software modules. One or more software modules may alternatively be used. These can include an executable program, a data link library, a configuration file, a database, a graphical image, a binary data file, a text data file, an object file, a source code file, or the like. When one or more computer processors execute one or more of the software modules, the software modules interact to cause one or more computer systems to perform according to the teachings herein.

The operation of the computer unit 802 can be controlled by a variety of different program modules. Examples of program modules are routines, programs, objects, components, data structures, libraries, etc. that perform particular tasks or implement particular abstract data types. The example embodiments may also be practiced with other computer system configurations, including handheld devices, multiprocessor systems, microprocessor-based or programmable consumer electronics, network PCs, minicomputers, mainframe computers, personal digital assistants, mobile telephones and the like. Furthermore, the example embodiments may also be practiced in distributed computing environments where tasks are performed by remote processing devices that are linked through a wireless or wired communications network. In a distributed computing environment, program modules may be located in both local and remote memory storage devices.

The description herein may be, in certain portions, explicitly or implicitly described as algorithms and/or functional operations that operate on data within a computer memory or an electronic circuit. These algorithmic descriptions and/or functional operations are usually used by those skilled in the information/data processing arts for efficient description. An algorithm is generally relating to a self-consistent sequence of steps leading to a desired result. The algorithmic steps can include physical manipulations of physical quantities, such as electrical, magnetic or optical signals capable of being stored, transmitted, transferred, combined, compared, and otherwise manipulated.

Further, unless specifically slated otherwise, and would ordinarily be apparent from the following, a person skilled in the ad will appreciate that throughout the present specification, discussions utilizing terms such as "scanning", "calculating", "determining", "replacing", "generating", "initializing", "outputting", and the like, refer to action and processes of an instructing processor/computer system, or similar electronic circuit/device/component, that manipulates/processes and transforms data represented as physical quantities within the described system into other data similarly represented as physical quantities within the system or other information storage, transmission or display devices etc.

The description also discloses relevant device/apparatus for performing the steps of the described methods. Such apparatus may be specifically constructed for the purposes of the methods, or may comprise a general purpose computer/processor or other device selectively activated or reconfigured by a computer program stored in a storage member. The algorithms and displays described herein are not inherently related to any particular computer or other apparatus. It is understood that general purpose devices/machines may be used in accordance with the teachings herein. Alternatively, the construction of a specialized device/apparatus to perform the method steps may be desired.

In addition, it is submitted that the description also implicitly covers a computer program, in that it would be clear that the steps of the methods described herein may be put into effect by computer code. It will be appreciated that a large variety of programming languages and coding can be used to implement the teachings of the description herein. Moreover, the computer program if applicable is not limited to any particular control flow and can use different control flows without departing from the scope of the invention.

Furthermore, one or more of the steps of the computer program if applicable may be performed in parallel and/or sequentially. Such a computer program if applicable may be stored on any computer readable medium. The computer readable medium may include storage devices such as magnetic or optical disks, memory chips, or other storage devices suitable for interfacing with a suitable reader/general purpose computer. In such instances, the computer readable storage medium is non-transitory. Such storage medium also covers all computer-readable media e.g. medium that stores data only for short periods of time and/or only in the presence of power, such as register memory, processor cache and Random Access Memory (RAM) and the like. The computer readable medium may even include a wired medium such as exemplified in the internet system, or wireless medium such as exemplified in bluetooth technology. The computer program when loaded and executed on a suitable reader effectively results in an apparatus that cars implement the steps of the described methods.

The example embodiments may also be implemented as hardware modules. A module is a functional hardware unit designed for use with other components or modules. For example, a module may be implemented using digital or discrete electronic components, or it can form a portion of an entire electronic circuit such as an Application Specific Integrated Circuit (ASIC). A person skilled in the art will understand that the example embodiments can also be implemented as a combination of hardware and software modules.

Additionally, when describing some embodiments, the disclosure may have disclosed a method and/or process as a particular sequence of steps. However, unless otherwise required, it will be appreciated the method or process should not be limited to the particular sequence of steps disclosed. Other sequences of steps may be possible. The particular order of the steps disclosed herein should not be construed as undue limitations. Unless otherwise required, a method and/or process disclosed herein should not be limited to the steps being carried out in the order written. The sequence of steps may be varied and still remain within the scope of the disclosure.

Further, in the description herein, the word "substantially" whenever used is understood to include, but not restricted to, "entirely" or "completely" and the like. In addition, terms such as "comprising", "comprise", and the like whenever used, are intended to be non-restricting descriptive language in that they broadly include elements/components recited after such terms, in addition to other components not explicitly recited. Further, terms such as "about", "approximately" and the like whenever used, typically means a reasonable variation, for example a variation of +/−5% of the disclosed value, or a variance of 4% of the disclosed value, or a variance of 3% of the disclosed value, a variance of 2% of the disclosed value or a variance of 1% of the disclosed value.

Furthermore, in the description herein, certain values may be disclosed in a range. The values showing the end points of a range are intended to illustrate a preferred range. Whenever a range has been described, it is intended that the range covers and teaches all possible sub-ranges as well as individual numerical values within that range. That is, the end points of a range should not be interpreted as inflexible limitations. For example, a description of a range of 1% to 5% is intended to have specifically disclosed sub-ranges 1% to 2% 1% to 3%, 1% to 4%, 2% to 3% etc., as well as individually, values within that range such as 1%, 2%, 3%, 4% and 5%. The intention of the above specific disclosure is applicable to any depth/breadth of a range.

The term "nano" as used herein is to be interpreted broadly to include dimensions less than about 1000 nm.

The terms "particle" and "particulate" material as used herein broadly refers to a discrete entity or a discrete body. The particle described herein can include an organic, an inorganic or a biological particle. Biological particles can include mammalian cell, blood cell, bacterial cell, cell organelle and virus. The particle used described herein may also be a macro-particle that is formed by an aggregate of a plurality of sub-particles or a fragment of a small object. The particle of the present disclosure may be spherical, substantially spherical, or non-spherical, such as irregularly shaped particles or ellipsoidally shaped particles. The term "size" when used to refer to the particle broadly refers to the largest dimension of the particle. For example, when the particle is substantially spherical, the term "size" can refer to the diameter of the particle; or when the particle is substantially non-spherical, the term "size" can refer to the largest length of the particle.

The term "nanoparticle" as used herein broadly refers to a discrete entity of physical dimension less than 100 nm. The nanoparticles as described herein may also be a macro-particle that is formed by an aggregate of a plurality of sub-particles or a fragment of a small object. The particle of the present disclosure may be spherical, substantially spherical, or non-spherical, such as irregularly shaped particles or ellipsoidally shaped particles.

The terms "coupled" or "connected" as used in this description are intended to cover both directly connected or connected through one or more intermediate means, unless otherwise stated.

In the example embodiment described with respect to FIG. 2, a processing module is provided to instruct the parameters and workflow for the components of the cleaning system. However, the example embodiments are not limited as such. For example, the dispensing of fluid, cleaning agent and/or chemical agent (e.g. start/stop, in any direction etc.) may be manually activated. The switching on/off of the electromagnetic wave emitting source may also be manually activated.

In example embodiments, the water dispenser may be configured to administer water at a pressure from about 20 psi (138 kPa) to about 100 psi (689 kPa), or from about 30 psi (207 kPa) to about 90 psi (621 kPa), or from about 40 psi (276 kPa) to about 80 psi (552 kPa), or from about 50 psi (345 kPa) to about 70 psi (483 kPa), or from about 50 psi (345 kPa) to about 60 psi (414 kPa).

In example embodiments, the wafer dispenser may be configured to administer water at a temperature from about 30° C. to about 70° C., or from about 40° C. to about 60° C., or from about 40° C. to about 50° C.

In the described example embodiments, the subject for cleaning has been described as a vehicle e.g. a car. However, the subject for cleaning is not limited as such. For example, any other types of vehicles may be the subject e.g. motorcycle, scooter, bicycle, van, truck and the like. For example, a vessel may be the subject e.g. a ship, boat, hovercraft, submarine and the like. Any object having a surface e.g. metallic, plastic, glass surfaces etc. may be a suitable subject for cleaning.

In the described example embodiments, the docking bay has been described to accommodate one vehicle. However, the docking bay is not limited as such, and more than one vehicle may be accommodated inside the docking bay for washing.

In the described example embodiments, the nozzles of the water dispenser, cleaning agent dispenser and chemical agent dispenser have been described as one or more nozzles mounted on a rail/trolley system which travels along the length and/or breadth of the vehicle and may also circumnavigate the vehicle. It is appreciated that the dispensers of water, cleaning agent and chemical agent are not limited to being movable as such and may comprise a plurality of nozzles positioned along the length, breadth and height of the docking bay to provide water, cleaning agent and chemical agent to substantially all surfaces of the vehicle.

In the described example embodiments, the water, cleaning agent and chemical agent dispensers have been described to have separate actuating rotating mechanisms for each dispenser. It is appreciated that the example embodiments are not limited as such and may, for example, comprise a single actuating rotating mechanism for actuating the water, cleaning agent and chemical agent dispensers.

In the described example embodiments, the cleaning system has been described as being automated by the processing module which controls the workflow and parameters. It is appreciated that the workflow of the cleaning system is not limited as such and the workflow may be semi-automated or manually operated by a user.

In the described example embodiments, the electromagnetic wave emitting source has been described to provide ultraviolet light to provide "activation" of the nanoparticles. It is appreciated that the electromagnetic wave emitting source is not limited as such and may be configured to provide electromagnetic wave of other wavelengths, e.g. visible light, infrared light etc.

In the described example embodiments, the water dispenser has been described to administer preferably, water or $H_2O$. It is appreciated that the water dispenser is not limited as such and may be configured to administer fluid suitable for rinsing.

In the described example embodiments, the cleaning system has been described to dispense the cleaning agent onto the surface of the vehicle, followed by dispensing the chemical agent onto the surface of the vehicle to contact the cleaning agent. However, it is appreciated that the cleaning agent may be pre-mixed with the chemical agent prior to being dispensed onto the surface of the vehicle, in one example, the pre-mixed composition of the cleaning agent and the chemical agent may be dispensed in addition to the subsequent dispensing of the chemical agent. In another example, the pre-mixed composition of the cleaning agent and the chemical agent may be used to substitute the subsequent step of dispensing the chemical agent.

In the described example embodiments, the cleaning system may have been described as a non-contact cleaning system. However, it is appreciated that the cleaning system may also be a contact cleaning system.

It will be appreciated by a person skilled in the art that other variations and/or modifications may be made to the specific embodiments without departing from the scope of the invention as broadly described. The present embodiments are, therefore, to be considered in all respects to be illustrative and not restrictive.

The invention claimed is:

1. A vehicular cleaning system comprising,
a cleaning agent comprising a mixture of metal-oxide nanoparticles,
a chemical agent provided to react with the cleaning agent to form resultant foam,
a cleaning agent dispenser coupled to a cleaning agent source to provide the cleaning agent that comprises a mixture of metal-oxide nanoparticles, the cleaning agent dispenser also to administer the cleaning agent to a surface of a vehicle or vessel for cleaning, and
a chemical agent dispenser to separately administer the chemical agent from the cleaning agent to the surface of the subject for cleaning for the chemical agent to react with the cleaning agent to form resultant foam.

2. The vehicular cleaning system as claimed in claim 1, wherein the cleaning agent comprises 8% by weight of an alkyl ester sulphate.

3. The vehicular cleaning system as claimed in claim 1, wherein the chemical agent comprises from 1% to 40% by volume of an alkali-soluble acrylic polymer in an emulsion.

4. The vehicular cleaning system as claimed in claim 1, wherein the cleaning agent, chemical agent, or both are in liquid form.

5. The vehicular cleaning system as claimed in claim 1, wherein the vehicle for cleaning is a car.

6. The vehicular cleaning system as claimed in claim 1, further comprising an electromagnetic wave emitting source configured to provide a specific wavelength of an electromagnetic wave to the surface of the subject for cleaning.

7. The vehicular cleaning system as claimed in claim 6, wherein the electromagnetic wave emitting source is configured to emit a wavelength in a range of about 200 nm to about 380 nm to activate the mixture of metal-oxide nanoparticles.

8. The vehicular cleaning system as claimed in claim 1, wherein the chemical agent dispenser is to administer the chemical agent as a coating layer on the surface of the subject for cleaning to react with the cleaning agent comprising a mixture of metal-oxide nanoparticles.

9. The vehicular cleaning system as claimed in claim 1, wherein the chemical agent dispenser is to administer the chemical agent in one or more bands on the surface of the subject for cleaning to react with the cleaning agent comprising a mixture of metal-oxide nanoparticles.

10. The vehicular cleaning system as claimed in claim 9, wherein the one or more bands is applied along one or more axes selected from a group consisting of a horizontal axis, a vertical axis and a diagonal axis with respect to the subject for cleaning to react with the cleaning agent comprising a mixture of metal-oxide nanoparticles.

11. The vehicular cleaning system as claimed in claim 1, wherein the mixture of metal-oxide nanoparticles comprises titanium dioxide ($TiO_2$), zinc oxide (ZnO) and aluminium oxide ($Al_2O_3$).

12. The vehicular cleaning system as claimed in claim 11, wherein the cleaning agent comprises 0.3% by volume of $TiO_2$ and 0.3% by volume of ZnO.

13. The vehicular cleaning system as claimed in claim 1, further comprising a processing module configured to control the vehicular cleaning system.

14. The vehicular cleaning system as claimed in claim 1, further comprising a wind generator configured to produce air movement over the subject for cleaning.

15. The vehicular cleaning system as claimed in claim 1, further comprising a fluid dispenser configured to administer fluid for rinsing the subject for cleaning.

16. The vehicular cleaning system as claimed in claim 15, wherein the fluid dispenser is further configured to administer fluid with a temperature of about 40° C. to about 70° C.

17. The vehicular cleaning system as claimed in claim 15, wherein the fluid dispenser is further configured to administer fluid with a pressure in a range of about 20 psi (138 kPa) to about 100 psi (689 kPa).

18. The vehicular cleaning system as claimed in claim 1, wherein the cleaning agent further comprises a pre-mixed chemical agent to facilitate foaming of the cleaning agent.

* * * * *